Figure 1:
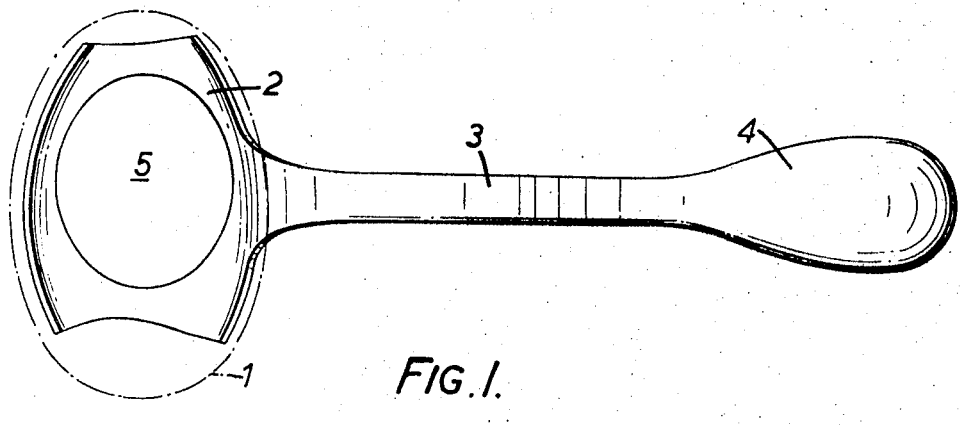

United States Patent
Hiles

[11] 3,838,511
[45] Oct. 1, 1974

[54] EGG DISPENSERS
[76] Inventor: Leonard Hiles, 291 Dunstable Rd., Luton, England
[22] Filed: Dec. 15, 1972
[21] Appl. No.: 315,765

[30] Foreign Application Priority Data
Mar. 25, 1972  Great Britain.................... 14128/72

[52] U.S. Cl...................... 30/325, 294/55, D7/140
[51] Int. Cl. ......................... A01b 1/00, A47j 43/28
[58] Field of Search........ 30/324, 325, 327; 294/55, 294/49; D7/140

[56] References Cited
UNITED STATES PATENTS
D92,138    5/1934    Thompson ....................... 30/324 X FOREIGN PATENTS OR APPLICATIONS
6,596      4/1913     Great Britain........................ 30/325
1,216,340  12/1970    Great Britain........................ 30/325

Primary Examiner—Al Lawrence Smith
Assistant Examiner—Marc R. Davidson
Attorney, Agent, or Firm—Seide, Gonda & Goldhammer

[57] ABSTRACT

An improved form of dispenser for dispensing hot boiled eggs into egg cups has a bowl with a hole in it the periphery of which hole conforms to the surface of an egg supported in the bowl with part of the egg projecting into the hole.

2 Claims, 2 Drawing Figures

EGG DISPENSERS

The present invention relates to a boiled egg dispenser. Such a dispenser is known from my British Pat. No. 1,216,340 which describes and claims an egg dispenser, for boiled eggs, comprising a bowl conforming with part of the surface of an egg having at least one hole in the bottom allowing water scooped up with the egg to drain away. The two opposite edges of the bowl or egg shaped part of the dispenser are shaped concave so that the egg can be placed straight into the egg cup from a horizontal position in the dispenser to a vertical position in the egg cup without the jamming of the dispenser between the egg and the egg cup without touching by any other means.

The present invention is concerned with improvements in the dispenser of my earlier British Pat. No. 1,216,340.

In the egg dispenser of my earlier patent the stability of the egg lying in the dispenser was determined by the accuracy with which the interior surface of the bowl conformed to the surface of the egg nesting upon it so that eggs of different sizes exhibited greater or lesser degrees of stability when supported by the dispenser.

The improvement of the present invention consists in so shaping and dimensioning the hole in the bowl of the dispenser that the periphery of the hole conforms to part of the surface of the egg to allow part of the egg to project into the hole. With this modification it is no longer necessary for the bowl surface to conform to the shape of the egg surface. Eggs of different sizes are supported with much the same stability in the improved dispenser and this stability persists over a greater angle of rotation of the dispenser bowl from the horizontal position towards the vertical position when placing the egg in an egg cup thus making the transfer of the egg from the dispenser to the egg cup a simpler and more reliable operation.

Figure 2:
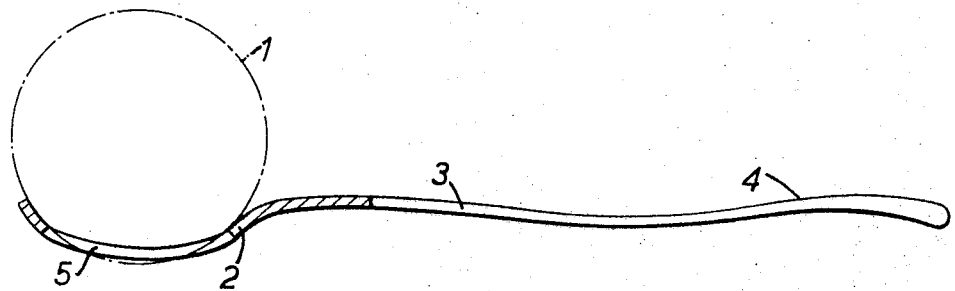

The accompanying drawings show, in FIG. 1, a plan view and in FIG. 2 a side view partly sectioned of a dispenser in accordance with the invention.

The dispenser comprises a bowl 2 integral with a handle 3 having a grip end 4 in the manner of a conventional spoon. The bowl 2 is of concave generally oval shape with the longer axis at right angles to the longitudinal axis of the handle 3 and has a hole 5 of such shape and size that an egg, indicated in chain-dotted line at 1, supported in the bowl extends into the hole 5 with the periphery of the hole 5 conforming to the outer surface of the egg 1, the degree of concavity of said bowl being less than the degree of curvature of the egg such that a part of the egg projects into the hole 5.

The edges of the bowl 2 at the ends of the longer axis are shaped concave to facilitate dispensing of an egg from the dispenser into an egg cup without jamming of the dispenser between the egg and the egg cup. It will be appreciated that only one end of the bowl need be shaped in this manner but it is preferable that both ends are so shaped.

The dispenser may be made in metal or in a synthetic plastics material which is form-sustaining at the temperature of boiling water.

I claim:

1. An egg dispenser comprising a handle part integral with a bowl part of concave generally oval shape having a longer axis at right angles to the longitudinal axis of the handle part, said bowl being defined by an outer peripheral edge, said bowl having a hole centrally thereof of such size and shape that the periphery of such hole conforms to the surface of an egg to be supported in said bowl, the degree of concavity of said bowl being less than the degree of curvature of said egg such that a part of said egg projects into said hole, the peripheral edge at at least one end of such longer axis having a concave shape when viewed from a plane parallel to the longitudinal axis of the handle part and the longer axis of the bowl part, such that the dispensing of an egg into an egg cup from that end of the dispenser is facilitated.

2. An egg dispenser according to claim 1 wherein the peripheral edge at both ends of the longer axis of the bowl part has a concave shape when viewed from a plane parallel to the longitudinal axis of the handle part and the longer axis of the bowl part.

* * * * *